United States Patent [19]

Miller

[11] 3,887,767

[45] June 3, 1975

[54] METHOD OF AND SYSTEM FOR LIGHT PEN READ-OUT MULTICELLED GASEOUS DISCHARGE DISPLAY/MEMORY DEVICE

[75] Inventor: John W. V. Miller, Toledo, Ohio

[73] Assignee: Owens-Illinois, Inc., Toledo, Ohio

[22] Filed: Oct. 1, 1973

[21] Appl. No.: 401,971

[52] U.S. Cl......... 178/18; 340/166 EL; 340/173 PL; 340/324 R
[51] Int. Cl....... G08b 5/22; G11c 7/00; H05b 41/00
[58] Field of Search......................... 178/18, 19, 20; 340/166 EL, 324 R, 173 PL, 173 LT, 173 LS, 173 LM

[56] References Cited
UNITED STATES PATENTS

| | | | |
|---|---|---|---|
| 3,559,307 | 2/1971 | Barrekette et al.................... | 178/18 |
| 3,651,509 | 3/1972 | Ngo ..................................... | 178/18 |
| 3,662,352 | 5/1972 | Schott........................... | 340/173 PL |
| 3,761,897 | 9/1973 | Tech .............................. | 340/324 R |
| 3,786,474 | 1/1974 | Miller .......................... | 340/166 EL |
| 3,796,997 | 3/1974 | Johnson et al.................. | 340/324 R |

*Primary Examiner*—Thomas A. Robinson
*Attorney, Agent, or Firm*—Donald Keith Wedding

[57] ABSTRACT

Identification of coordinates of a selected area of a multicelled gaseous discharge display/memory device is accomplished by positioning a radiant energy detector having a restricted field on the selected area and then selectively and temporarily altering the discharge state of the cells in the device. When the radiant energy emitted incidental to the change of discharge state of a cell is sensed by the light detector, its response actuates identifying means for the cell then subject to the control of the discharge state altering means. "Interrogation voltage" signals of levels distinct from the normal sustainer voltage levels are applied during periods of interruption of the sustainer voltage to cause changes of discharge state in cells between an "off state" and an "interrogation state." This causes changes in cell wall voltage between an "off state" level and an "interrogation state" level, and causes an emission of radiant energy without altering the wall voltage of "on state" cells to a degree preventing their retention of the "on state" when the sustainer voltage is reapplied. A "turn on interrogation" voltage is applied in a line-by-line sequence which causes cells of the line being scanned which were in the "on state" of discharge to remain in the "on state" at or near their normal wall voltage levels while those which were in the "off state" are transferred to an "on interrogation state" exhibiting a wall voltage level above the normal level for display/memory "on state" cells. A "turn off interrogation" voltage is applied in cell-by-cell sequence along an axis transverse of that to which the "turn on interrogation" voltage is applied. Its level discharges cells having an "interrogation" wall voltage to an "off state" wall voltage while cells having an "on state" wall voltage retain that wall voltage. The detector can be enabled selectively during a selected portion of the scanning transfer of cell states. When a transfer of a cell from an "off state" to an "on interrogation state" is detected, the line of the cell is identified. The detection of the "turn off interrogation" discharge identifies the cell position along the previously identified line. Coordinates of cells in the "on state" of discharge can be identified by inverting the device cell discharge states to place them to the "off state" and employing the above interrogation sequence.

33 Claims, 3 Drawing Figures

METHOD OF AND SYSTEM FOR LIGHT PEN READ-OUT MULTICELLED GASEOUS DISCHARGE DISPLAY/MEMORY DEVICE

BACKGROUND OF THE INVENTION

Multicelled gas discharge devices as display and/or memory units have been proposed in the form of a pair of opposed dielectric charge storage members which are backed by electrodes, the electrodes being so formed and oriented with respect to an ionizable gaseous medium as to define a plurality of discrete gas discharge cells. Charged particles (electrons and ions) produced upon ionization of the gas volume of a selected discharge cell, when proper alternating operating voltages are applied between opposed electrodes, are collected upon the surface of the dielectric at specifically defined locations and constitute an electrical field opposing the electrical field which created them. Those collected charges aid an applied voltage of the polarity opposite that which created them so that they aid in the initiation of another discharge by imposing a total voltage across the gas sufficient to again initiate a discharge and a collection of charges. This repetitive and alternating charge collection and ionization discharge constitutes an electrical memory of a cell in the "on state" of discharge. With properly chosen values of the alternating voltage, cells in the "off state" of discharge remain in that state during the alternations, hence that state is also retained in electrical memory.

The alternating voltage offering the above memory characteristics is termed a sustaining voltage. For a given device it usually has a range of values.

Change of the state of individual cells in a device subject to a sustaining voltage has been accomplished by superimposing voltage pulses on the sustaining voltage. Cells in an off state of discharge have been turned on by pulses, usually applied to the opposed electrodes of the selected cell, which raise the voltage imposed across the gas to a level which initiates an ionization discharge of a magnitude to cause sufficient charged particles to collect on the dielectric surface of the cell to cause a repetition of the discharge by virtue of the augmentation of the reversed sustainer voltage with the wall charge voltage. Cells in the on state of discharge are selectively manipulated to the off state by applying a voltage pulse across the selected cell in opposition to the currently applied sustainer and of a magnitude sufficient to discharge the wall charge without developing an opposite wall charge at the on state level. In each of a turn on discharge and a turn off discharge a burst of light is emitted over a very short portion of the sustainer half period. For example, where the sustainer is applied at a typical 50 kilohertz the light burst of on state cells may be of about 500 nanoseconds in the initial transition portion of each 10 microsecond half cycle where essentially a square wave form is imposed.

Heretofore techniques have been sought to identify coordinates on the matrix of a gas discharge display/memory device from the device face. Such identification has been accomplished with cathode ray tubes, particularly when those tubes have been employed as displays for computers. For example, an image can be amended by identifying coordinates on the display face of the tube and applying appropriate signals to the tube to erase or write those coordinates. Generally such techniques have required extensive memory banks for the tube coordinates being manipulated together with controls for the elements positioned on the exterior of the tube display to enable the manipulations, commonly termed a "light pen."

An object of the present invention is to identify a cell in a multicelled gas discharge device from a selected position external of the device.

Another object is to identify the discharge state of a cell in a multicelled gas discharge device from the exterior of the device.

A third object is to identify the coordinates of a cell and its state of discharge in a multicelled gas discharge device without loss of the state of discharge of the cell.

A fourth object is to retain the internal storage functions of a multicelled gas discharge device for the cells utilized in that storage without requiring external memory and while identifying the location and/or discharge state of any selected cell in the multicelled matrix of the device.

SUMMARY OF THE INVENTION

This invention relates to multicelled gaseous discharge display/memory devices and more particularly to methods of and systems for light pen operations on such devices. Coordinates of a cell in a matrix of cells made up of the intersections or cross points of the electrodes of opposed electrode arrays transversely related to each other are identified by sensing the radiant energy emitted when the cell is selectively discharged. For example, where the electrode arrays are each an array of parallel line electrodes and the opposed electrodes of the arrays are orthogonally related to form rows and columns of cells on a panel the row location of a light pen on the panel can be ascertained by discharging cells a row at a time in a progressive scan of rows until the area under the pen emits light. The row upon which the discharging control is effective at the moment of light detection is thereby identified as the row coordinate of the light pen location. That row is then scanned cell-by-cell until the light pen again senses a discharge within its field, at which time the column coordinate of the light pen location is defined by marking that coordinate subject at the moment of detection to discharge energization.

Pen location and the state of discharge of the cell in the pen field can be read without permanently changing that state. The sensed emissions are derived from operations on cells in the off state of discharge as they are transferred between the off state and an on interrogation state. Thus the light pen can be enabled for one normal sustainer half cycle as a preliminary sampling of the state of the matrix area within its field. If no emission is detected, it indicates the area is in an off state of discharge and the non-destructive readout of its coordinates can be initiated. If emission is detected, the panel can be inverted as by shifting the sustainer levels to cause all cells in the on state to transfer to the off state and all calls in the off state to transfer to the on state. The nondestructive readout of the cell coordinates in the pen field can then proceed. When the coordinates have been established the panel can be reinverted to return all cells to their original state, the state they were in prior to light pen operation, and the regular sustainer voltage can be imposed. Nondestructive scanning of a cell matrix is performed by establishing a wall charge on those cells in the on state of discharge and, with that wall charge maintained, subjecting those cells having a neutral or essentially neutral wall change as a result of being in the off state of discharge to a voltage transition sufficient to institute a discharge. The voltage transition is applied to a group of cells which can include cells in the on state without altering the wall charge or discharge state of those normal on cells in the group since the transition is in a direction neutralized by the existing wall charge so that its difference from that wall charge voltage is insufficient to institute a further discharge in cells having that wall voltage. A light burst due to the discharge thus occurs only in the cells which were in the off state at the time the interrogating voltage transition was imposed. These manipulations produce an array of cells including cells at two distinct wall charge voltages, the cells in the original on state having a wall charge voltage less than those transferred to the on state by the interrogating voltage transition.

A return of the multicelled matrix to the conditions which existed prior to the interrogating voltage transition is accomplished by imposing a restoring voltage transition of a polarity and magnitude sufficient to institute a discharge to an off state wall charge level in those cells at the higher wall voltage yet insufficient to institute a discharge in the cells at the lower wall charge level of a normally on cell. After the restoring voltage transition has been applied to all cells subject to the interrogating voltage transition, regular sustainer voltages can be imposed and the conventional cell manipulating signals for erase, write, conditioning and like functions can be applied to the device.

The light detector of the light pen is selectively enabled in synchronism with localized interrogating and restoring voltage transitions. Interrogation can be conducted a row of cells at a time until a row in the field of the light pen is interrogated. It is then convenient to interrogate the cell position in that row by suitable scan sequence controls. While the cell position can be sensed by restoring all cells of the row to their original state and progressively scanning the coordinates transverse of the row, a more efficient technique is to apply the restorative voltage transition as a progressive scan of the row and sense the light burst of that restorative discharge with the selectively enabled light pen.

In practice the interrogating voltage transition is applied to electrodes of one electrode array of the device and the restorative voltage transition to another electrode array of the device. Thus, if the light pen detects no emission of light for manipulation of the discharge states of the cells in that row, the original state of the cells in that row is restored by applying a low level restorative pulse to at least all normally off cells through their electrodes in the array opposite that being scanned. This low level pulse is of sufficient magnitude to cause the discharge of those cells having the high level charge voltage by exceeding the firing voltage level between the opposed electrodes without altering the state of the normally on cells which have a lower wall charge voltage. The discharge is to or near the level for an off state cell, hence the cells of the scanned row are returned to their normal condition.

When the row of cells including a cell within the field of the light pen is interrogated by a high voltage pulse, the emission of the cell in the pen field is detected and the row scan routine is instituted. A cell-by-cell scan routine is instituted. A cell-by-cell scan can be made by individually extinguishing the discharges in the normally off cells of the row. That is the cells can be subjected to low level pulses on their individual electrodes of the array opposite the row in sequence, with sufficient time differentiation between the leading edges of those pulses to enable the light pen to respond to and actuate identifying means for the cell location. After the second coordinate of the cell is identified the scan functions can be terminated and the panel returned to normal operation.

The system of this invention includes means to generate the voltage waveforms to accomplish the above manipulations, to synchronize the enabling of the light pen with the discharges, and to mark the state and location of the effective cell in the light pen field.

DESCRIPTION OF THE PREFERRED EMBODIMENTS

Figure 1:
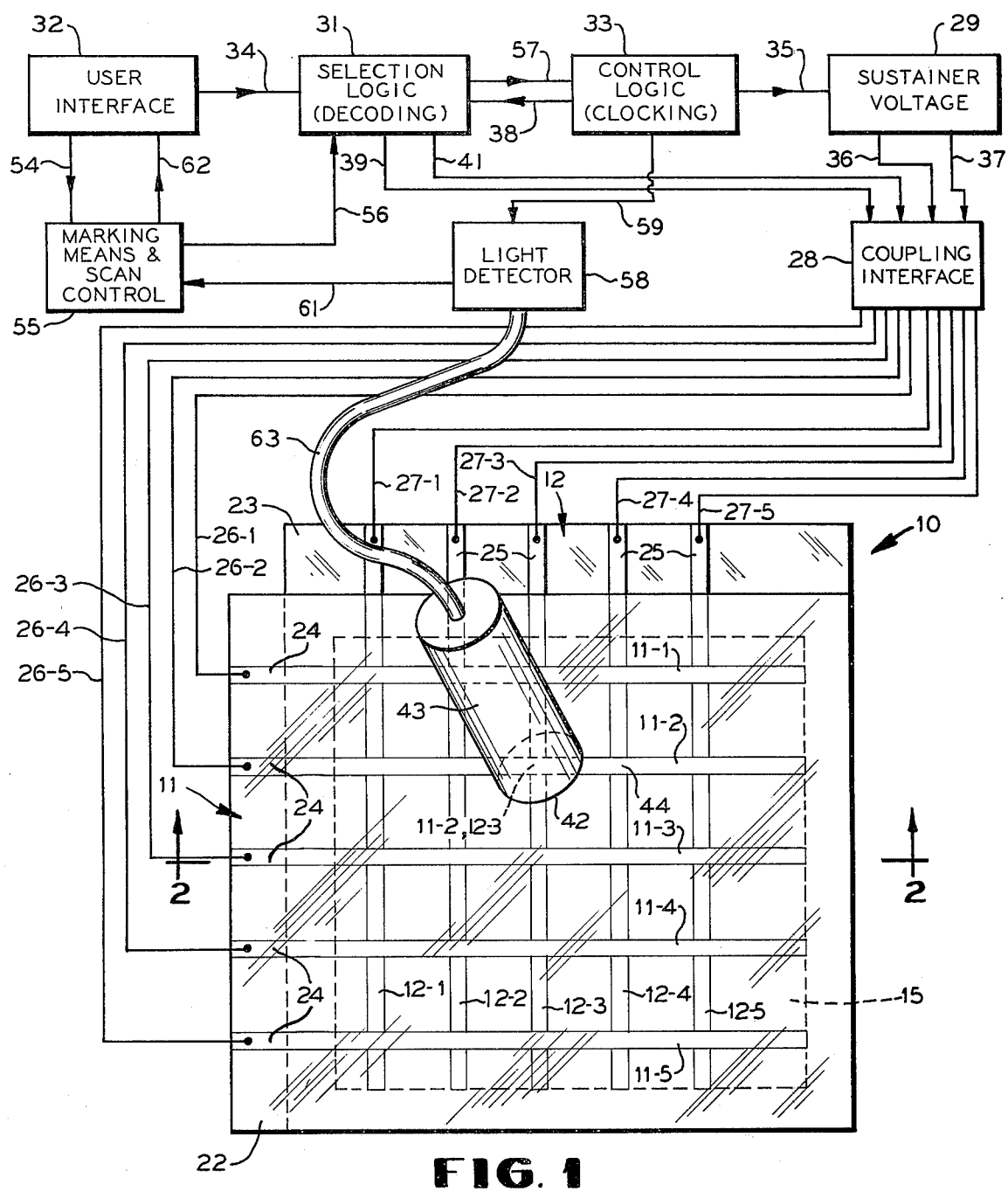
FIG. 1 is a diagrammatic representation of a display panel having a cell matrix of 5 by 5 cells and including a block diagram of the controls for the panel, together with a light pickup element, light detector and its associated block diagrammed circuits as associated with the panel controls and connections to a user's interfacing circuitry.
Figure 2:
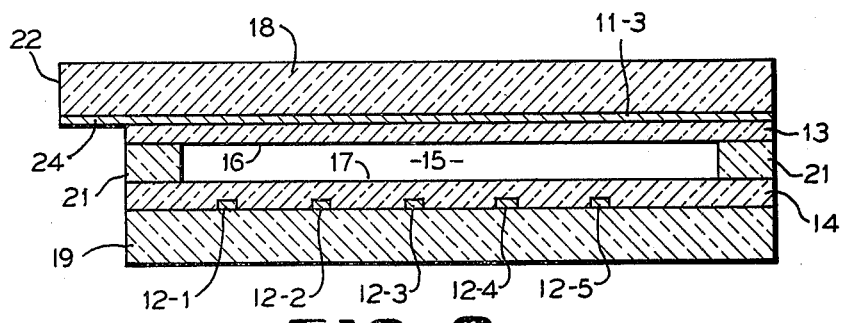
FIG. 2 is a cross-sectional view (enlarged, but not to proportional scale since the thickness of the gas volume, dielectric members and conductor arrays have been enlarged for purposes of illustration) taken on lines 2—2 of FIG. 1.

An exemplary form of multicelled gas discharge display/memory device 10 is shown in FIGS. 1 and 2 as made up of opposed electrode arrays 11 and 12 having dielectric layers 13 and 14 overcoating the electrodes and separating them from a gaseous medium 15 enclosed in the space between the proximate surfaces 16 and 17 of the layers 13 and 14. When the physical characteristics and operating parameters are properly chosen, a panel assembly 10 can provide a display in the form of lighted and darkened localized areas in patterns which provide visual displays of images either as lighted images on a darker background or darker images on a lighted background.

As shown in FIG. 2 the arrays 12 and 13 can be formed in situ on dielectric backing members 18 and 19, advantageously glass plates where transparency for visual display of discharges is desired, typically about ⅛ to ¼ inch thick. The electrodes 12 and 13 can be individual conductive strips having a resistance of less than 3,000 ohms per inch and preferably about 50 ohms per inch and can be in the form of parallel straight conductors typically 3 mils wide spaced about 17 mils on centers. The conductor strips are, for example, about 8,000 angstroms thick, and may be transparent, semitransparent, or opaque conductive material such as tin oxide, gold or aluminum. Dielectric overlays are formed on the plate supported conductors as layers 13 and 14 about 1 mil thick. The gas volume 15 is thin, usually under 10 mils and typically about 4 to 6 mils in thickness. It is a nature to produce a copious supply of charged particles (ions and electrons). These charges are alternately collectable on the surfaces 16 and 17 of dielectric layers 13 and 14 at opposed or facing elemental or discrete areas defined by the conductor arrays on the non-gas contacting sides of the layers. Many gases can be employed in volume 15. One form of display panel has a neon-krypton or neon-argon atmosphere with neon about 99.7% by weight and maintained at about atmospheric pressure.

Planar panels 10 are made up by forming electrode arrays on their respective backing members, overcoating the arrays with dielectric and mounting the dielectric overcoats in face to face relation with a dielectric spacer 21 bonded to the respective dielectric layers 13 and 14. A tubulation (not shown) is provided into the volume 15 to enable the atmosphere to be introduced.

The panel 10 is arranged with backing member extensions 22 and 23 which extend beyond the opposed backing member to provide support for and access to terminal portions 24 and 25 for the electrodes 11 and 12 respectively. In order to facilitate the connection of external circuits, portions 24 and 25 are free of dielectric overcoats and leads 26 and 27 are connected to respective terminal portions for the $x$ and $y$ electrode arrays.

Operating signals are applied over leads 26 and 27 through a coupling interface 28 which can comprise pulsers (not shown) for superimposing signals on a periodic pulsating sustainer voltage from source 29 in response to signals from a decoder 31. Generally information from the user's equipment such as a computer or data terminal (not shown) is passed by interface circuitry 32 and decoded by selection logic 31 for the cell manipulations required in the display/memory functions of panel 10. Synchronization of the decoded signals with the sustainer voltage is by means of control logic 33 which provides the clocking of the sustainer.

In normal operation of the panel, information from the user interface 32 is passed to selection logic 31 over path 34 while the control logic 33 regularly clocks the sustainer voltage 29 over path 35 to impose a sustainer voltage component on the $x$ axis of the panel 10 on path 36, on the $y$ axis, on path 37. Selection logic is timed with respect to the sustainer clocking from control logic 33 over path 38 so that manipulating signals are controlled for the cells corresponding to the information decoded in 31 by signals passed on path 39 for the $x$ coordinate and on path 41 for the $y$ coordinate of each selected cell.

For convenience the cells have been designated by their electrodes which, in turn, are designated by suffix numbers separated from the general reference character for the electrodes as 11-1, 11-2 ... 11-$n$ for the $x$ array electrodes and 12-1, 12-2 ... 12-$n$ for the $y$ array electrodes. In the discussion of the light pen features of this invention the cell of particular interest will be cell 11-2, 12-3 as shown in the field of response 42 of the radiant energy pickup 43 in FIG. 1.

The discrete areas of panel 10 comprising individual discharge cells emit radiant energy, conveniently visible light and hereafter termed "light" as a result of gaseous discharges produced when a voltage exceeding that necessary to ionize the gas is imposed between the electrodes of cross points 44. Such cells are defined as the shadow area between the electrodes 11 and 12 of the opposed electrode arrays when viewed along a common perpendicular to each of the arrays and the light is visible from the exterior of the panel assembly for those cross points or cells through a translucent structure which can include one electrode and/or a fringe area around one electrode. A discharge is maintained and thus stored, once it is initiated in a cell, by causing charged particles in the gas (electrons and ions) to be attracted to the opposed dielectric surfaces 16 and 17 overlying the electrode subject to a potential opposite that of the particle charge. A dielectric surface over but one electrode of each cell will also provide a charge collection surface. These charges build up a wall potential opposing and tending to neutralize that applied to the electrodes and by the neutralization tend to terminate the discharge and light emitted as a result of the discharge. Reversal of the potential applied to the electrode arrays, when at a given level determined by the device parameters, applies a potential across the cell opposite that which caused the previous discharge which is of a magnitude which, if augmented by a wall voltage, reignites the discharge to again cause a burst of light and collection of charged particles on the dielectric surfaces 16 and 17. By regular reversal of this applied potential the discharge is caused to repeat itself and thereby to be sustained as a memory or stored signal.

The periodically applied voltage which is below the potential which will fire a discharge in the cells and is sufficient when augmented by a wall voltage to sustain a series of discharges in cells is termed the "sustainer voltage" and is represented as plot 45 in FIG. 3. The wall charge voltage of cells in an on state of discharge is superimposed in FIG. 3$h$ on plot 45 as plot 46 in dashed lines and a plot 47 of the wall charge voltage of cells in the off state of discharge is shown as a dot-dash line superimposed on plot 45 essentially at the neutral axis of the plot 45.

Figure 3:
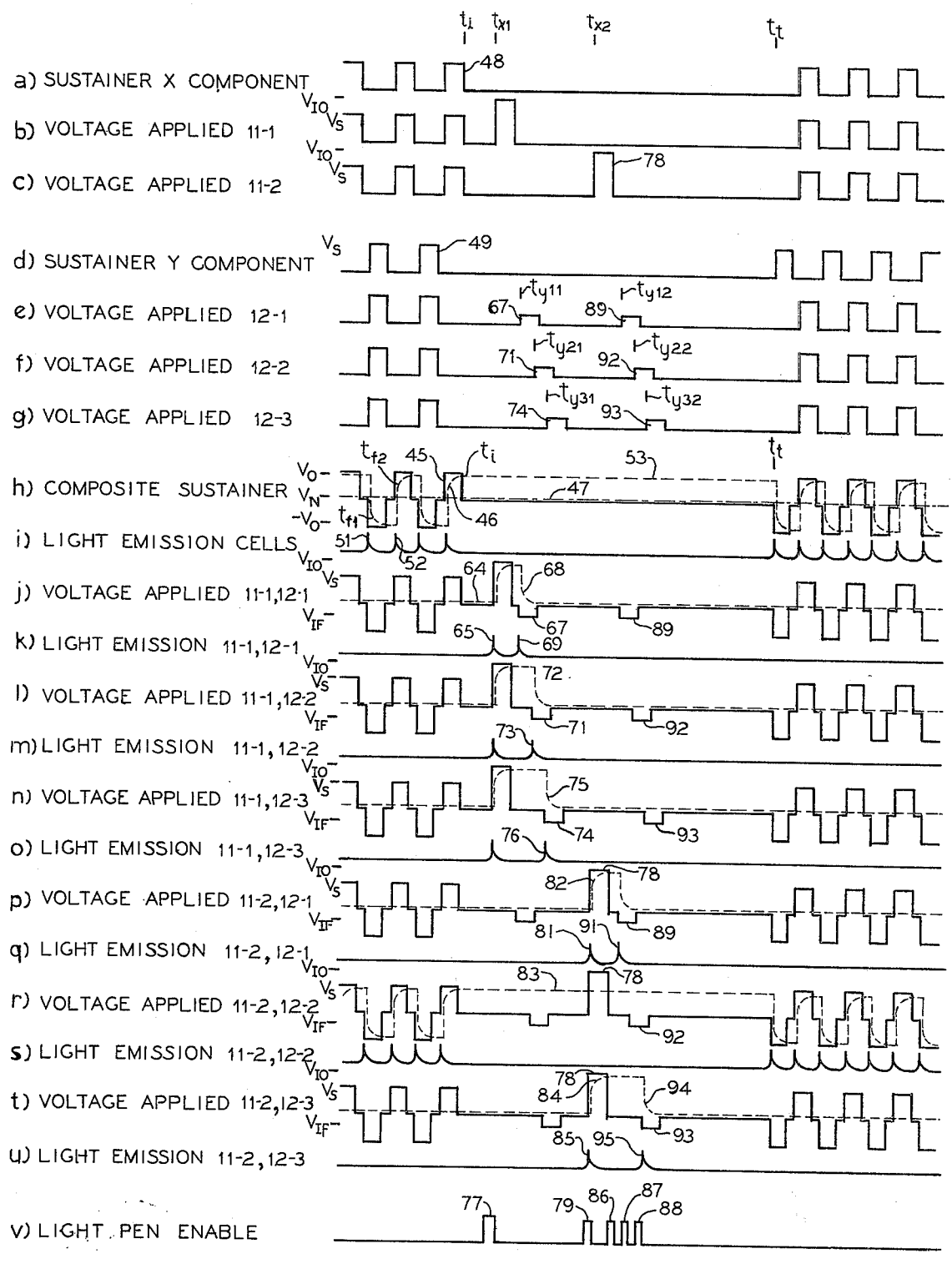
FIG. 3 is a plot against time of voltage waveforms including sustainer components, the composite sustainer, and the voltages applied to individual electrodes and cells under normal and light pen operation, together with cell wall voltages, light emissions, and light pen enabling signals for normal and light pen utilizations.

Sustainer voltages typically are developed by applying pulsating voltages to the opposed electrode arrays which are shifted in phase with respect to each other so that where the arrays 11 and 12 are respectively designated $x$ and $y$ the component $x$ and $y$ waveforms 48 and 49 of FIGS. 3$a$ and 3$d$ subtract to produce a composite waveform 45 of ($x$–$y$).

Multicelled gas discharge display panels constructed and operated according to the disclosures of T. C. Baker, et al., U.S. Pat. No. 3,499,167 which issued Mar. 3, 1970 typify the construction and normal operating means and modes for devices according to this invention wherein an open cell construction of the device is utilized. Closed cell devices wherein each cell is enclosed in an individual dielectric cavity as by apertures in a dielectric plate sandwiched between plate supported electrode arrays are shown in D. L. Bitzer, et al., U.S. Pat. No. 3,599,190 of Jan. 26, 1971. Typical circuits for applying sustainer voltages and individual cell discharge state manipulating voltages are shown in W. E. Johnson U.S. Pat. No. 3,513,327 of July 19, 1970 and W. E. Johnson U.S. Pat. No. 3,611,296 of Oct. 5, 1971.

Devices of the type to which this invention applies can function as display and memory devices or merely as memory devices where no discharge light is visible. However, in order to provide light pen operations as contemplated by this invention, cell discharges should produce localized radiant energy in a frequency range detectable by the element hereafter termed a "light detector." It is to be understood that ordinarily that radiation will be visible light and will be passed by translucent support and dielectric members for viewing from the exterior of the device. However, that energy can also be outside the visible spectrum provided the device passes detectable levels to the area accessible to the pickup element 43 of the light detector.

Light or radiant energy is developed in a multicelled gas discharge device by igniting a discharge in the gas between the opposed electrodes of the cells. It is localized to individual cells by the potentials applied between the opposed electrodes, gas pressure and other parameters of the device. Typically a multicelled panel can be operated at 50 kilohertz with a sustainer voltage transition of 240 volts imposed as 120 volt pulses on each array of electrodes forming the opposed electrodes of the individual cells. Cell wall voltages for cells in the on state of discharge approach the voltage level of the sustainer component applied to the electrode underlying the dielectric separating the electrode from the gas. Typical voltages for igniting a discharge in a cell of the exemplary panel can be about 210 volts in practical applications. The sustainer voltage transitions normally are in regular cycles, with discharges occuring in cells having an adequate augmenting wall voltage, cells in the on state, twice each period, when the total voltage across the cells exceeds that required to ignite a discharge. This occurs on waveform 45 upon the transition to the opposite potential as at $t_{f1}$ and $t_{f2}$.

In normal operation cells can be manipulated between the off state and the on state of discharge by addressing voltage pulses to their electrodes selectively in accordance with signals received from user interface circuitry 32 from equipment such as a typewriter, data terminal, computer or other signal source (not shown). These signals are decoded to the panel coordinates required to form an appropriate image for display by selection logic 31 at appropriate instants in the application of the periodically pulsating sustainer voltage from sustainer voltage control 29, as determined by control logic 33 clocking the sustainer. The sustainer waveform generated as voltage pulses controlled for the $x$ and $y$ arrays are applied in parallel to the respective arrays over leads 26-1 through 26-5 and 27-1 through 27-5 for respective $x$ and $y$ electrodes of the panel. Manipulating signals are superimposed to augment the sustainer voltages to a potential sufficient to transfer an off state cell to an on state of discharge by applying voltages to the electrodes whose cross point 44 defines the cell selected. Such signals as applied to the individual electrodes are termed "partial selects" and where equal magnitudes of an aiding nature are applied to the opposed electrodes of the cell so that each is half the manipulating signal they are termed "half selects." Typically a write pulse applied for a portion of one half a sustainer period can be about 250 to 300 volts to assure that the short interval, signal pulse transfers the cell from an off state of discharge to an on state of discharge. Conversely, when it is desired to erase a cell in the on state of discharge, its wall charge is reduced to or near the neutral level by a discharge induced by application of a select signal which discharges the wall charge then present to a level providing a wall voltage for the cell below that which will augment the next sustainer transition to a firing voltage level.

Each discharge of a cell whether as a transfer between discharge states or for a cell in the on state results in a burst of light, typically having a sharp rising wavefront and an exponential decay and having a duration of about 500 nanoseconds. Thus as shown on the on state cell wall voltage plot of FIG. 3h each charge transition as at $t_{f1}$ and $t_{f2}$ results in a light burst as at 51 and 52 of FIG. 3i for an on state cell. A light burst would be evident if a transition of a cell to an off state by an erase select signal were illustrated.

Light pen operation for a multicelled gas discharge device is accomplished by producing light emitting discharges in localized regions of the multicell matrix of the device without loss of memory of the state of the cells established in normal operation prior to the initiation of the light pen function. It is characteristic of cells in multicelled discharge devices that when the sustainer voltage is interrupted those cells in the on state of discharge retain their wall charge and wall voltage for long intervals, typically hours or even a day. It is also a characteristic that cells respond in their discharge functions to potential differences imposed across the gas between their electrodes and not to absolute values of applied voltage. That is if a cell discharge will ignite when 240 volts is applied across the gas between its opposed electrodes, that cell will discharge with one electrode at 300 volts and the opposite electrode at 540 volts or 60 volts but will not discharge for lesser applied voltage differences. Convenience has usually dictated operation around a reference value of about ground with transitions of 120 volts on either side of ground for the exemplary cell discharge.

The discharges employed in light pen operation are separated in time from the discharges of normal device operation. This is accomplished by interrupting normal operation for an interval sufficient to perform the light pen interrogating function of the device. Both turn on interrogation light bursts and turn off interrogation light bursts are available for interrogation. Hence an interrogation routine can be arranged to utilize only one type of light burst or both. While various scan sequences can be employed for the interrogating function, a progressive scan of the rows of cells in the $x$ coordinate will be discussed wherein individual rows of cells are interrogated by being subjected to an applied voltage, the turn on interrogation voltage, sufficient to ignite a discharge of those cells in the off state but insufficient to ignite a discharge of those cells in the on state. If a cell row does not include a discharged cell within the detection field 42 of the light pickup element 43, the row of cells will be returned to their normal state of discharge and succeeding rows are interrogated by application of turn on interrogation voltage until a cell discharge occurs in the detection field 42. When a row interrogation discharge is detected in the detection field 42, that row is marked by appropriate signals in marking means 55 which correlate the row subjected to the signal with the detection of the radiation and a scan across the cells in the row is undertaken. Advantageously, the light discharge of returning the cells to their off state can be utilized in this scan of individual cells, however, the interrogation need not be so limited and can even be accomplished by erasing all interrogated cells of the row and individually transferring them to an on interrogation state for light pen detection. The return of a cell in the on interrogation state to the off state is accomplished by applying across the cell a voltage, the turn off interrogation voltage, of a level which is sufficient to discharge a cell having an on state wall voltage. Such turn off interrogation voltage signals are applied to the column electrodes which oppose the row electrodes of the cells, e.g., to the y array electrodes 12 when the turn on interrogation voltage was applied to the x array electrodes 11.

Typically, a turn on interrogation voltage of 210 volts, displaced from the neutral axis of the sustainer voltage waveform in the same direction as the last applied sustainer pulses applied as a single pulse of a duration of the order of half a normal sustainer period will turn on all off state cells of the row associated with an electrode of the array being interrogated. This 210 volts across the gas of the cells having negligible wall voltage will ignite discharges in those cells, however, cells in the on state for the exemplary device, will have a wall voltage of about 120 volts, and since the 210 volt displacement is in the same direction as the sustainer pulse neutralized by the wall voltage, that wall voltage subtracts from the applied signal and only about 90 volts (210-120) are applied to on state cells. This is insufficient to ignite a discharge in those on state cells, hence they retain their sustainer established wall voltage of about 120 volts.

Turn off interrogation voltage for the above example can be about 30 volts applied in a direction displaced from the sustainer neutral opposite that of the next preceding sustainer pulse and the turn on interrogation voltage. Such an applied signal when augmented by the wall charge voltage of the turn on interrogation signal, about 210 volts, imposes a discharge igniting potential of about 240 volts across the gas of the cells so charged. However, the lesser normal on state cell wall voltage of about 120 volts, imposes only about 150 volts across the cells in the on state of discharge. Those cells are not discharged by this imposed voltage. The magnitude and duration of the turn off interrogation voltage limits the wall charge and neutralizing wall voltage to less than 30 volts, a level which is insufficient to cause further discharges in the cells when the 120 volt sustainer is again applied. The normally off state cells are thus returned to a level sufficiently near the neutral voltage to avoid discharges in those cells and to enable the charge to dissipate within a few sustainer cycles upon return of the device to normal sustainer operation.

Light pen interrogation can be instituted from the user's equipment through user interface 32 by appropriate signals through the selection logic 31 and control logic 33 to the sustainer voltage source 29 to interrupt the sustainer voltage as at time $t_i$ with the x component of the sustainer voltage at its reference level following an excursion to its high level and prior to an excursion of the y component from its reference level. As shown on the composite sustainer plot 45, this results in a high wall voltage 46 being present on those cells of the cell matrix which are in the on state of discharge. This high wall voltage is retained as indicated by the horizontal dashed wall voltage trace 53 until the light pen interrogation is terminated at time $t_f$. No light emission from on state cells occurs in the interval $t_i$ through $t_f$.

Interrogation also involves actuating a scan control according to a sequence which can be controlled in the panel controls to initiate a discharge in those cells in the off state without altering the wall charge established for cells in the on state. A signal is passed through the user interface 32 on path 54 to the marking means and scan control 55 which pass signals on path 56 to cause the selection logic 31 to apply control signals for the interrogating signals to the coupling interface 28. These interrogating signals are clocked by control logic 33 actuated on path 57 to apply appropriately timed signals through path 38 to trigger the selection logic 31 and to the light detector 58 via path 59 to enable the light pen detection functions.

Light detector 58 with its pickup 43 is of conventional construction including photoelectric and amplifying elements. It is sensitive to spurious signals and can be subject to noise levels which tend to swamp out the signals attributed to discharge radiation in field 42. In order to minimize the effect of noise, the light detector is enabled selectively. However, it is to be understood that the pen functions can be accomplished with a continuously responsive light detector where signal-to-noise ratio is tolerable. Various enabling intervals can be employed in practice depending upon the interrogation routine employed. Since the panel activity is reduced when the sustainer voltage application is interrupted, the light detector can be enabled during the entire interrogation interval. Better noise rejection and correlation of detected interrogation signal radiation can be realized by enabling the light detector only when interrogation signals are applied. For example, the detector can be enabled at or near the termination of the rise of the interrogation signals since the discharge radiation will be initiated at that time. Typically an enabled interval of about a microsecond will be adequate.

Light detector 58 responds to light of discharges within field 42 of pickup 43 when it is placed against the external face of the display panel overlying the cell matrix. Thus if field 42 registers with cell 11-2, 12-3 as illustrated in FIG. 1, when that cell is caused to discharge the light detector 58 will respond if it is enabled. In the exemplary search routine the row interrogation is detected on the initial transfer of off state cells to the on interrogation condition of discharge and hence, the light detector is enabled during the imposition of the leading edge of the turn on interrogation signal. In the absence of a detected light burst, the row is turned off either by a sequentially applied turn off interrogation signal to individual or groups of cells of the row or by a broadside or simultaneous turn off interrogation signal to all cells of the row. When a light burst for a row turn on interrogation signal is detected, the light detector 58 passes a signal on path 61 to the marking means of marking means and scan control 55 which identifies the row coordinate of the light pen detection field 42 and passes that information on path 62 to the user's equipment through interface 32. The marking means and scan control 55 also initiates a subroutine to scan the marked row of cells for the cell position along the row of detection field 42. This involves actuation of appropriate functions in selection logic 31 to clock turn off interrogation pulses by the control logic 33 and gate the light detector 58 during the pulse leading edges until a light burst is detected and the marking means 55 actuated to provide the second coordinate of the cell in detection field 42.

Light detector 58 can be a photo sensitive device coupled as by a fiber optics conduit 63 to a pickup element 43 having a suitable means defining field 42. The photo sensitive device can have suitable gating electronics for enabling control responses to be issued to path 61 at appropriate times. Alternatively a photo sensitive transducer can be mounted in the pickup element 43 to pass an electric signal over an electrical conductor, conduit 63, to a detector 58 having selectively enabled circuitry to issue signals at 61 when the clock enables the detector in sychronism with the application of interrogating signals.

Turn on interrogation signals are imposed on a row of cells by applying to the electrodes 11-1 ... 11-N via conductors 26-1 ... 26-n from coupling interface 28 a voltage exceeding the reference level by the cell voltage required to initiate a discharge from the neutral wall voltage and not exceeding the wall charge voltage of cells in the on state for normal operation by a voltage sufficient to initiate a discharge. Interrogating signals to return cells turned on by the turn on interrogation signals of the off state are of a magnitude and polarity to oppose the wall charge voltage resulting from the turn on signals with sufficient voltage to cause those cells to discharge to an off state and to a wall voltage near the composite sustainer voltage neutral. The turn off interrogation signals should not be of sufficient voltage difference from the wall voltage of cells in the on state for normal operation to achieve their firing voltage. Interrogation turn off of the cells for a row may precede the interrogation turn on of other rows in the search.

In practice rows of cells are turned on by applying a voltage pulse to the electrode common to the cells of the rows, as 11-1 ... 11-n, and enabling the light detector during the leading portion of the turn on interrogation signal to detect a turn on discharge. The cells of a row are turned off by applying voltage pulses to the electrodes forming cross points for the cells, 12-1 ... 12-n, with the common electrode 11 of the cell row. When a light pen detection is sought the cells are turned off in sequence and the light detector is enabled during the leading edge of each turn off pulse to respond to the light emitted by a turn off discharge instituted by that leading edge.

A specific example of the scan of the first and second rows of cells, the x coordinates, and the first three columns of cells in those rows, the y coordinates, to establish the illustrated location of the light pen as over cell 11-2, 12-3 is shown in the plots of applied signals against time and the wall charges developed in FIG. 3. When a light pen operation is instituted by a signal, as from the user interface 32, it becomes effective at time $t_i$ as the x component of the sustainer voltage applied to electrodes 11 is shifted from its high value $V_s$ to its reference value and holds the x component at its reference value throughout the light pen interrogation interval between $t_i$ and $t_t$ as shown in plot 3a. The y component of sustainer voltage is also held at its reference value during this interval as shown in plot 3d. The first row of cells in the x coordinate is interrogated at time $t_{x1}$ by imposing a turn on interrogate voltage $V_{IO}$ as shown in plot 3b. Voltage $V_{IO}$ is of a value to cause off state cells in the first row to be turned on without altering the wall voltage or causing a discharge in cells in the on state.

The composite applied voltage to the first cell of the first row is shown in plot 3j. It will be noted that cell was off during normal sustainer cycles since its wall charge voltage, the dashed line 64, is shown at the neutral level. With voltage $V_{IO}$ applied at time $t_{x1}$ at a level sufficient to ignite a discharge, the cell wall charge increases to develop a wall voltage at a level tending to neutralize $V_{IO}$. This level is greater than the wall voltage $V_O$ of on state cells. At the time cell 11-1, 12-1 discharges, a burst of light 65 is issued in its area, see plot 3k, without effect. In similar manner each of the second and third cells of the first row are transferred to a discharged state by application of $V_{IO}$ to electrode 11-1, as represented by plots 3l and 3n respectively and produce light bursts as represented by 3m and 3o respectively.

A sequenced erasure of the interrogation discharged cells is assumed. Cells are erased by developing a discharge which reduces their wall charge to or near a level imposing a neutral wall voltage on the cell walls. This is accomplished by pulsing the electrode of the array opposite the common row electrode for each cell to be erased. Since the cells which were turned on for interrogation have a wall voltage near level $V_{IO}$ and the applied voltage level $V_{IO}$ was sufficient to initiate a discharge from the neutral wall voltage $V_N$ of those cells, application of a voltage $V_{IF}$ only slightly beyond the neutral level will initiate another discharge. The cell will be subject to a voltage across its electrodes of $V_{IO} - V_{IF}$ in excess of its firing potential. Voltage $V_{IF}$ is less than the sustainer voltage $V_S$ of the same polarity applied during normal operation. Since $V_{IO}$ was higher than the wall voltage of normally on cells the application of $V_{IF}$ to an electrode of a normally on cell applied a potential across the cell $V_S - V_{IF} < V_{IO} - V_{IF}$ and will not discharge that cell to an off state of wall charge.

Turn off interrogation signals are shown in plots 3e, 3f and 3g for electrodes in plots 3j, 3l and 3n and the light burst emitted at their leading edges as shown in plots 3k, 3m and 3o. It will be noted that the turn off interrogation signals have leading edges which are spaced in time although the duration of the pulses can be such that they overlap in time. The time spacing of the leading edges provide time spacing of the light bursts emitted by each cell so they can be individually detected on a time base for cell identification. Turn off interrogation signal 67 applied to electrode 12-1 causes the discharge of cell 11-1, 12-1 at time $t_{y11}$ and the wall voltage of that cell is reduced to or near neutral as at 68 with the insuance of light burst 69. Shortly thereafter at time $t_{y21}$ signal 71 erases cell 11-1, 12-2 producing a wall voltage transition 72 and a light burst 73. Still later, at time $t_{y31}$, signal 74 erases cell 11-1, 12-3 with a wall voltage transition as at 75 and a light burst at 76.

In the assumed case of a light pen located in registry with cell 11-2, 12-3, the interrogation of the first row by the turn on interrogation signal involves an enabling of the light detector during the application of the leading edge of that signal as shown at 77 of plot 3v. Since no light burst is detected during enable interval 77, no further detection of the first row of cells is programmed and no attempt to detect bursts 69, 73 and 76 is made.

When the first row of cells have been returned to their normal operation state, the next row is subjected to a turn on interrogation signal as shown in plot 3c and 78 and at time $t_{x2}$. Assume that the first and third cells are in an off state and the second cell is in an on state in the second row of cells. This is illustrated in the individual cell applied voltage and wall voltage plots 3p, 3r and 3t where at time $t_i$, cell 11-2, 12-1 is in an off state and has a wall voltage at or near the neutral level of plot 3p, cell 11-2, 12-2 is in an on state as evidenced by the cell wall voltage transitions during the regular sustainer cycles prior to time $t_i$ and subsequent to $t_t$ of plot 3r, and cell 11-2, 12-3 is as cell 11-2, 12-1. The turn on interrogation signal 78 is applied while light pen enable signal 79 is effective to permit detection of a a burst of light in field 42. Cell 11-2, 12-1 issues a light burst 81 as it is transferred from the off to the on state of discharge and its wall voltage rises at 82. Since cell 11-2, 12-2 is on the signal 78 does not impose a sufficient voltage difference from the wall voltage shown at 83 to cause it to discharge, and the cell retains its normal on state wall voltage. Therefore, cell 11-2, 12-2 emits no light at this time as shown at plot 3s. Cell 11-2, 12-3 responds to signal 78 by turning on. Its wall voltage rises as at 84 and light is emitted as burst 85 of plot 3u.

Light pickup element 43, having its field 42 in registry with cell 11-2, 12-3, responds to light burst 85 to issue a signal to marking means and scan control 55 indicating the pen is on the second row. This information can be passed to the user's equipment over path 62 and user interface 32. Scan control 55 terminates the row search and initiates a cell search along the second row in response to detection of light burst 85.

The wall voltage developed in response to the turn on interrogation signal in those cells which are normally off is retained until the cell is discharged to a neutral or near neutral wall voltage. A sequence of turn off interrogation signals are applied to the electrodes in the arrow opposite the common electrode of the second row of cells. Since one of these signals will result in a light burst within the pickup field 42, this scan routine is programmed with light detector enable signals 86, 87 and 88 imposed for intervals embracing the initial rise of each turn off interrogation signal.

At time $y_{m2}$ the light pen enable signal 86 is imposed and turn off interrogation signal 89 is clocked to electrode 12-1 on plot 3e and to cell 11-2, 12-1 on plot 3p to cause that cell to issue a burst of light 91 on plot 3q, without effect. Enable signal 87 and turn off interrogation signal 92 are issued at time $t_{y22}$ without effect because the voltage difference between on cell wall voltage 83 and the effective negative excursion of 92 imposes insufficient voltage across the cell to institute a discharge. At time $t_{y32}$ enable signal 88 and turn off interrogation signal 93 are imposed to discharge cell 11-2, 12-3 causing wall voltage transition 94 to or near the voltage level, plot 3t, and light burst 95, plot 3u. Light pen detects the light burst 95 and actuates the marking means and scan control 55 to terminate the scan and define the y coordinate of the light pen field 42 as electrode 12-3 thereby completing the identification of those coordinates for the marking and/or the user's equipment.

Signals for interrogation functions can be developed by pulser circuits corresponding to those circuits which have been employed for partial select signal generation in the past. One such form of pulser employs a power transistor wherein the desired voltage is applied to the electrode through the emitter-collector circuit of the transistor in response to a base signal which shifts the transistor between cut off and saturation.

The above discussed waveforms can be altered. For example if the turn off interrogation signal is broadsided to all cells where no response is detected to a turn on interrogation signal for a row, the wall voltage of all off state cells of the row would be alike and, in the case of the first row, curves 3l and 3n would correspond to 3j and curves 3m and 3o would correspond to 3k. If only turn on interrogation signal discharges were detected the turn on interrogation signals would also be applied to the electrodes 12-1 . . . 12-n during a scan sequence of the column or y coordinates.

In the above discussion it has been assumed that the light pickup element 43 was positioned with its field 42 in registry with a cell which was in the off state of discharge during normal sustainer voltage application. Had the cell been in the on state of discharge nondestructive readout of its coordinates could not be accomplished with the application of turn on interrogation signals and turn off interrogation signals. In order to identify coordinates of an on state cell by these techniques and the matrix of cells including the cell subject to interrogation can be inverted, i.e., the on state cells can be transferred to the off state and the off state cells transferred to the on state and the routine discussed above then applied.

An on state cell can be detected in field 42 at the outset of light pen operation by enabling the pen prior to the interruption of the sustainer voltage. If a discharge is detected the area subject to interrogation includes an on state cell and inversion of the cell matrix should be programmed prior to the coordinate identification routine. Alternatively, if a cell matrix is completely scanned along one axis, as by the application of turn on interrogation signals to all x electrodes 11 without the detection of a discharge the cell subject to interrogation can be presumed to be in the on state and the cell matrix can be inverted so that a following search routine will be effective.

Cell matrix inversion can be accomplished by shifting the composite sustainer waveform so that the neutral wall voltage level of the on state cells and the original neutral wall voltage coincides with the wall voltage for the on state cells subject to the shifted sustainer. One means of achieving such a shift is to impose a constant plateau voltage of $V_s$ on one of the sustainer components when it is at its value $V_s$ and the on state cells have a wall voltage at the inverted neutral wall voltage level so that it then pulses between a level $V_s$ above its neutral and $2V_s$ above its neutral. A reinversion to normal sustainer levels can be accomplished after the interrogation of cell coordinates is completed by removal of the plateau voltage at a time when the cells inverted to the on state had a wall voltage at the original neutral wall voltage level.

In view of the variations in scan interrogation routines and variations in system utilizations for the light pen method and system described above it is to be appreciated that the specific detailed example is presented merely is illustrative of the invention and is not to be red in a limting sense.

What is claimed is:

1. The method of ascertaining the location of one or more selected cells in a multicelled gas discharge display/memory device, each said cells comprising an electrode in a first array common to a plurality of cells, an electrode in a second array spaced from the electrode of the first array, a volume of ionizable gas in the vicinity of the electrodes of the first and second arrays, and at least one dielectric layer separating one of the electrodes from the gas volume, the cells having the characteristics that individual cells are sustained in their "on state" or "off state" of discharge when subjected to a sustainer voltage between respective electrodes of the first and second array which is periodically alternating between sustainer voltage magnitudes on opposite sides of a neutral voltage including:

positioning a pickup for discharge radiation in registry with the selected cells;

interrupting the application of the sustainer voltage alternations between the electrodes of the first and second array;

transferring in succession each of a plurality of cells in an "off state" of discharge between an "off state" of discharge and an "on interrogation state" of discharge to cause said cells to issue discharge radiation at unique moments during the interruption of the sustainer alterations;

sensing the discharge radiation of the selected cell by said pickup means when that cell is transferred between the "off state" and an "on interrogation state;" and correlating the sensing of the discharge with the transfer of the selected cells discharge state.

2. The method according to claim 1 wherein the step of transferring each cell includes applying a turn on interrogation voltage to one electrode of the cell of a polarity relative to the neutral voltage corresponding to the polarity relative to the neutral voltage of the last applied sustainer voltage and of a magnitude sufficient to ignite an on interrogation state discharge in a cell in an off state of discharge, said magnitude being insufficient to ignite a discharge in a cell which is in an on state of discharge; and applying a turn off interrogation voltage to a cell electrode of the array opposite that of the one electrode, subsequent to application of a turn on interrogation voltage to that cell, the voltage being of a polarity relative to the neutral voltage which is opposite the turn on interrogation voltage and of a magnitude sufficient to discharge a cell in an on interrogation state of discharge to an off state of discharge and insufficient to ignite a discharge in cells in an on state of discharge.

3. The method according to claim 1 including the step of reapplying the sustainer voltage alternations between the electrodes of the first and second array subsequent to the correlation of the sensed discharge.

4. The method according to claim 1 including the steps of sensing that the selected cell is in the on state of discharge; inverting the discharge state of the plurality of cells when the selected cell is in the on state; transferring the discharge state of each cell between an off state and an on interrogation state of discharge while the plurality of cells are inverted; sensing the discharge radiation f the selected cell when that cell is transferred between the off state and an on interrogation state while the plurality of cells are inverted and correlating the sensing of the discharge with the transfer of the selected cell discharge state while the plurality of cells are inverted.

5. The method according to claim 2 wherein the steps of sensing and correlating the discharge are practiced with respect to the discharge resulting from application of a turn on interrogation voltage to the selected cell.

6. The method according to claim 2 wherein the steps of sensing and correlating the discharge are practiced with respect to the discharge resulting from application of a turn off interrogation voltage to the selected cell.

7. The method according to claim 2 wherein the turn on interrogation signal is applied to an electrode in the first array which is common to a plurality of cells whereby cells of said common plurality which are in the off state of discharge are simultaneously transferred to an on interrogation state of discharge.

8. The method according to claim 7 wherein the turn off interrogation signal is applied to an electrode in the second array.

9. The method according to claim 8 wherein the turn off interrogation signal is applied at a unique moment for each cell in the common plurality of cells.

10. The method according to claim 1 including the step of generating clocking signals to enable said correlating and to actuate said transfer in overlapping timed relation.

11. The method according to claim 1 wherein said step of correlating includes sensing the coincidence of the discharge of a cell with the transfer of the cell between the off state and an on interrogation state.

12. The method of ascertaining the location of a selected cell in a multicelled gas discharge display/memory device, said cell comprising an electrode in a first array common to a plurality of cells, an electrode in a second array spaced from the electrode of the first array, a volume of ionizable gas in the vicinity of the electrodes of the first and second arrays, and at least one dielectric layer separating one of the electrodes from the gas, the cells having the characteristics that individual cells are sustained in their on state or off state of discharge when subject to a sustainer voltage between respective electrodes of the first and second arrays which is periodically alternated between sustainer voltage magnitude on opposite sides of a neutral voltage including: interrupting the application of the sustainer voltage across the respective electrodes for an interrogation interval; applying to the electrode of said first array a first interrogating voltage of a polarity relative to the neutral voltage corresponding to the polarity relative to the neutral voltage of the last applied sustainer voltage and of a magnitude sufficient to ignite an interrogation state discharge in cells common to the electrode which are in an off state of discharge, said magnitude being insufficient to ignite a discharge in cells common to the electrode which are in an on state of discharge; positioning in registry with the selected cell a radiant energy pickup having a restricted area field of response; sequentially applying to a plurality of electrodes of said second array a second interrogating voltage of a polarity relative to the neutral voltage which is opposite the first interrogating voltage and of a magnitude sufficient to discharge cell in an interrogation state of discharge to an off state of discharge and insufficient to ignite a discharge in cells in an "on state" of discharge; sensing the emission of radiant energy by a discharge in response to an interrogating voltage of a cell in registry with the field of the pickup; and correlating the sensing of a discharge of a cell with the application of an interrogating voltage.

13. The method according to claim 12 wherein said step of correlating includes identifying the electrode of the second array to which the second interrogating voltage is applied in coincidence with the sensing of a discharge by the pickup.

14. The method of ascertaining the location of a selected cell in a multicelled gas discharge display/memory device, said cell comprising an electrode in a first array common to a plurality of cells an electrode in a second array spaced from the first array and common to a plurality of cells, a volume of ionizable gas between the electrodes of the first and second arrays, and at least one dielectric layer separating one of the electrodes from the gas, the cells having the characteristic that individual cells are sustained in their state of discharge when subject to a sustainer voltage between respective electrodes of the first and second array which is periodically alternated between sustainer voltage magnitudes on opposite sides of a neutral voltage including: interrupting the application of the sustainer voltage across the respective electrodes of a plurality of cells having a common electrode for an interrogation interval; sequentially applying in a predetermined order to electrodes of one array a first interrogating voltage of a polarity relative to the neutral voltage corresponding to the polarity relative to the neutral voltage of the last applied sustainer voltage and a magnitude sufficient to ignite an interrogation state discharge in the cells common to an electrode which are in an off state of discharge, said magnitude being sufficient to ignite a discharge in cells common to an electrode which are in an on state of discharge; sequentially applying in a predetermined order to electrodes of the other array a second interrogating voltage of a polarity relative to the neutral voltage which is opposite the first interrogating voltage and of a magnitude sufficient to discharge cells in an interrogation state of discharge to an off state of discharge and insufficient to ignite a discharge in cells in an on state of discharge; positioning in registry with the selected cell a radiant energy pickup responsive to radiant energy emitted by cells as they discharge and having a restricted area field of response; sensing the emission of radiant energy by a discharge in response to an interrogating voltage of a cell in registry with the field of the pickup; and correlating the sensing of a discharge with the application of an interrogating voltage.

15. The method according to claim 14 wherein said step of correlating includes sensing the coincidence of the discharge of a cell with the application of the interrogating voltage.

16. The method according to claim 14 including the steps of terminating the sequential application of the first interrogating voltage in response to the sensing of a discharge; and instituting the sequential application of the second interrogating voltage in response to the sensing of a discharge caused by the first interrogating voltage.

17. The method according to claim 16 including the step of terminating the sequential application of the second interrogating voltage in response to the sensing of a discharge caused by the second interrogating voltage.

18. The method according to claim 14 including the step of applying the sustainer voltage across the respective electrodes to terminate the interruption in response to the correlation of the discharge with application of an interrogating voltage.

19. The method according to claim 14 wherein the sensing of emission is for the first and second interrogating voltages; and the correlating of sensed discharge is with the application of the first and second interrogating voltages.

20. The method according to claim 14 including the step of producing clocking signals to enable the sensing and to actuate the interrogating signal application in overlapping timed relation.

21. The method of ascertaining the location of a gaseous discharge display/memory cell in a matrix of such cells each comprising proximate portions of electrodes in each of two electrode arrays, an ionizable gas volume in the vicinity of the proximate electrode portions, and a dielectric layer separating at least one electrode portion from the gas volume including the steps of: applying a sustaining voltage waveform across the two electrode arrays; interrupting the application of the sustaining voltage; sequentially creating radiant energy emitting discharges in selected cells in the off state of discharge during the interruption of the sustaining voltage while maintaining the on state of discharge of cells in the on state at the time of interruption of the sustaining voltage; detecting radiant energy emitted over a restricted area of the matrix during the creation of off state cell discharges; and correlating the detection of radiant energy with the creation of off state cell discharges.

22. The method according to claim 21 wherein the emitting discharges produce an interrogation cell wall voltage exceeding the wall voltage of cells in the on state at the time of interruption of the sustaining voltage in transferring a cell from the off state of discharge; and including the step of applying an interrogating voltage to the cell having the interrogation cell wall voltage, said interrogation signal having a magnitude and polarity to discharge a cell having an interrogation cell wall voltage to a wall voltage of a cell in the off state of discharge and being insufficient to discharge a cell having the wall voltage of cells in the on state.

23. The method according to claim 21 wherein the cell whose location is to be ascertained is in the on state of discharge comprising the step of inverting the state of discharge of the cells in the matrix preceding the steps of interrupting the sustaining voltage, creating discharges, detecting emitted energy and correlating the detection with cell location for the created discharge.

24. The method according to claim 21 wherein the matrix of cells extend in rows along two axes transverse to each other with each row of a plurality of cells along one axis including portions of a common electrode in the first array extending along the axis and each row of a plurality of cells along the other axis including portions of a common electrode in the second array extending along the other axis and wherein the step of sequentially creating discharges is practiced a row at a time by applying to a common electrode of the row in the first array an interrogation signal transferring off state cells from an off state of discharge; and including the steps of sequentially applying second interrogation signals to electrodes of the second array of a level to return to the off state of discharge those cells of the row in the first array which were transferred from an off state by the first interrogating signal; and detecting a second burst of radiant energy emitted over the restricted area of the matrix during the return cells of the off state.

25. A system for identifying the location of a discharge cell in a gaseous discharge display/memory device having a matrix of discrete discharge cells selectively transferable between an on state of discharge characterized by a wall charge and by an on state wall voltage and an off state of discharge characterized by an off state wall voltage; means for applying a periodic pulsating sustainer voltage across a plurality of said cells to cause periodic discharges in cells which are in an on state of discharge without causing discharges in cells which are in an off state of discharge; means for interrupting the application of said periodic pulsating sustainer voltage to a plurality of cells with any cell in the on state of discharge retaining the on state wall voltage; means for selectively applying turn on interrogation voltage signals to cells of said cell matrix of a magnitude and polarity which imposes a voltage across cells in an off state of discharge sufficient to institute an interrogation discharge in said cells to cause the emission of radiant energy from said cells, and to develop an interrogation wall voltage on said cells exceeding the wall voltage of on state cells, said turn on interrogation voltage differing from the wall voltage of on state cells by an amount sufficient to institute a discharge in said on state cells; means for selectively applying turn off interrogation signals to cells of said cell matrix of a magnitude and polarity which impose a voltage across cells having an interrogation wall voltage sufficient to discharge said cells to an off state wall voltage to cause the emission of radiant energy from said cells and of a magnitude of impose a voltage insufficient to discharge said cells having an on state wall voltage; a radiant energy pickup element having a limited area field of response which is selectively positionable in registry with portions of said matrix of cells; a radiant energy detector in communication with said pickup element and adapted to produce a signal in response to detected radiant energy from cell discharges; and means to correlate the detector signal with the selectively applied interrogation signals.

26. A system according to claim 25 wherein said means for applying interrogation signals includes means for sequentially applying said signals to said cells.

27. A system according to claim 25 wherein said cells comprise an electrode in a first array common to a plurality of cells, an electrode in a second array spaced from the electrode of the first array, a volume of ionizable gas in the vicinity of the electrodes of the first and second arrays, and at least one dielectric layer spacing one of the electrodes from the gas; and wherein said means for applying turn on interrogation voltage signals is coupled to said common electrode in said first array to institute simultaneously an interrogation discharge in any cells common to said electrode which were in the off state of discharge.

28. A system according to claim 25 wherein said matrix comprises a first electrode array including a plurality of electrodes each of which has portions common to a plurality of cells spaced along its length, a second electrode array including a plurality of electrodes extending transverse of the electrodes of said first array and each of which has portions common to a plurality of cells spaced along its length and spaced from portions of the electrodes of the first array, a volume of ionizable gas in the vicinity of the portions of the electrodes of the first and second arrays forming each cell, and at least one dielectric layer spacing one of the electrodes from the gas; including means coupling said means for applying turn on interrogation voltage signals to electrodes of said first array; means sequentially applying said turn on interrogation voltage to individual electrodes of said first array to institute simultaneously an interrogation discharge in any cells common to said electrode which were in the off state of discharge; means coupling said means for applying turn off interrogating signals to electrodes of said second array; and means sequentially applying said turn of interrogation voltage to individual electrodes of said second array to transfer any cells common to said electrode which had an interrogation wall voltage to an off state wall voltage.

29. A system according to claim 28 wherein said means sequentially applying said turn off interrogation voltage is operated intermediately each application of a turn on interrogation voltage to an electrode of said first array.

30. A system according to claim 28 including control means to institute the application of turn off interrogation voltage to said second array in response to the detection by said detector of radiant energy resulting from a turn on interrogation voltage.

31. A system according to claim 28 wherein said means to correlate includes marking means responsive to a signal from said detector resulting from application of a turn on interrogation voltage signal to identify the electrode of the first array to which said turn on interrogation signal was applied.

32. A system according to claim 31 wherein said means to correlate includes marking means responsive to a signal from said detector resulting from application of a turn off interrogation voltage signal to identify the electrode of the second array to which said turn off interrogation signal was applied.

33. A system according to claim 25 including means to selectively enable said detector in synchronism with the application of individual interrogation voltage signals.

* * * * *